(12) United States Patent  
Inoue (10) Patent No.: US 10,614,275 B2  
(45) Date of Patent: Apr. 7, 2020

(54) POSITION SPECIFYING APPARATUS AND POSITION SPECIFYING METHOD

(71) Applicant: Mitutoyo Corporation, Kawasaki, Kanagawa (JP)

(72) Inventor: Yuto Inoue, Ibaraki (JP)

(73) Assignee: MITUTOYO CORPORATION, Kawasaki (JP)

( * ) Notice: Subject to any disclaimer, the term of this patent is extended or adjusted under 35 U.S.C. 154(b) by 172 days.

(21) Appl. No.: 15/623,797

(22) Filed: Jun. 15, 2017

(65) Prior Publication Data

US 2017/0364723 A1 Dec. 21, 2017

(30) Foreign Application Priority Data

Jun. 21, 2016 (JP) ................................. 2016-122221

(51) Int. Cl.
*G06K 7/14* (2006.01)

(52) U.S. Cl.
CPC ......... *G06K 7/1417* (2013.01); *G06K 7/1443* (2013.01)

(58) Field of Classification Search
CPC .......................... G06K 7/1417; G06K 7/1443
See application file for complete search history.

(56) References Cited

U.S. PATENT DOCUMENTS

| 9,111,186 | B2* | 8/2015 | Blasinski | G06K 19/0614 |
| 2004/0089796 | A1 | 5/2004 | Patzwald et al. | |
| 2004/0218181 | A1* | 11/2004 | Jones | G01D 5/2455 356/401 |
| 2010/0084468 | A1* | 4/2010 | Lapstun | G06K 7/10772 235/454 |
| 2010/0147956 | A1* | 6/2010 | Wang | G06K 7/10722 235/472.01 |

(Continued)

FOREIGN PATENT DOCUMENTS

| JP | 2004-163435 | 6/2004 |
| JP | 2008-533590 | 8/2008 |

(Continued)

OTHER PUBLICATIONS

Blasinski et al. "Per-Colorant-Channel Color Barcodes for Mobile Applications: An Interference Cancellation Framework." IEEE. vol. 22, No. 4. p. 1488-1511 (Year: 2013).*

(Continued)

*Primary Examiner* — Thien M Le  
*Assistant Examiner* — Asifa Habib  
(74) *Attorney, Agent, or Firm* — Rankin, Hill & Clark LLP (57) ABSTRACT

A measurement apparatus includes an image acquisition part that acquires a captured image obtained by imaging a partial area on a two-dimensional scale on which a plurality of two-dimensional codes having a first code, which is specified by a combination pattern of a first pixel value image and a second pixel value image, and a second code, which is specified by a pattern of a type different from the combination pattern, are arranged, a code specification part that specifies the first code and the second code corresponding to the two-dimensional code included in the captured image, and a position specification part that specifies position information on the two-dimensional scale of the two-dimensional code including the first code and the second code on the basis of the first code and the second code.

10 Claims, 6 Drawing Sheets

(56) References Cited

U.S. PATENT DOCUMENTS

| | | | |
|---|---|---|---|
| 2011/0110586 A1 | 5/2011 | Takura et al. | |
| 2011/0233284 A1* | 9/2011 | Howard | G06K 19/06037 |
| | | | 235/494 |
| 2012/0248196 A1* | 10/2012 | Wang | G06K 7/10722 |
| | | | 235/472.01 |
| 2016/0092760 A1* | 3/2016 | Tanaka | G06K 7/1443 |
| | | | 382/180 |

FOREIGN PATENT DOCUMENTS

| | | |
|---|---|---|
| JP | 4463612 | 2/2010 |
| JP | 2011-145826 | 7/2011 |
| WO | 2006/098954 | 9/2006 |
| WO | 2009-144794 | 12/2009 |

OTHER PUBLICATIONS

Japanese Office Action dated Jan. 21, 2020 of counterpart Japanese Application No. 2016-122221, English translation included, 8 pages.

\* cited by examiner

POSITION SPECIFYING APPARATUS AND POSITION SPECIFYING METHOD

CROSS-REFERENCE TO RELATED APPLICATIONS

The present application claims priority to Japanese Patent Application number 2016-122221, filed on Jun. 21, 2016. The content of this application is incorporated herein by reference in its entirety.

BACKGROUND OF THE INVENTION

Conventionally, a position specifying apparatus that specifies a position of an image probe on the basis of a two-dimensional code and a quasi-random pattern drawn on a two-dimensional scale is known. For example, Japanese Patent No. 4463612 discloses a position specifying apparatus that i) specifies a position of an image probe by detecting a two-dimensional code and a quasi-random pattern drawn on a two-dimensional scale using an image probe and by specifying position information on the two-dimensional scale included in the two-dimensional code, and that ii) specifies a position of the image probe on the two-dimensional scale by calculating a relative position of the quasi-random pattern from a center of a field of view corresponding to the image probe on the basis of an image correlation between the quasi-random pattern and a template image.

Because the conventional position specifying apparatus reads the two-dimensional image arranged in a lattice pattern on the two-dimensional scale using the image probe, the time required for specifying the position on the two-dimensional scale was determined by the reading speed of the image probe. Further, when the amount of data for specifying the position is large, the area of the pattern image included in the two-dimensional code becomes large, and so the reading time of the image probe in the conventional position specifying apparatus becomes long. As a result, it took a long time to specify the position. Therefore, there is a demand to shorten the reading time of the two-dimensional code on the two-dimensional scale.

BRIEF SUMMARY OF THE INVENTION

A position specifying apparatus according to a first aspect of the present invention includes an image acquisition part that acquires a captured image obtained by imaging a partial area on a two-dimensional scale on which a plurality of two-dimensional codes having a first code, which is specified by a combination pattern of a first pixel value image and a second pixel value image, and a second code, which is specified by a pattern of a type different from the combination pattern, are arranged, a code specification part that specifies the first code and the second code corresponding to the two-dimensional code included in the captured image, and a position specification part that specifies position information, on the two-dimensional scale, of the two-dimensional code including the first code and the second code on the basis of the first code and the second code.

The position specifying apparatus according to a second aspect of the present invention includes imaging, by an image probe, a partial area on a two-dimensional scale on which a plurality of two-dimensional codes having a first code, which is specified by a combination pattern of a first pixel value image and a second pixel value image, and a second code, which is specified by a pattern of a type different from the combination pattern, are arranged, acquiring, by a position specifying apparatus, a captured image obtained by capturing by the image probe, specifying, by a position specifying apparatus, the first code and the second code corresponding to the two-dimensional code included in the captured image, and specifying, by a position specification apparatus, position information on the two-dimensional scale of the two-dimensional code including the first code and the second code on the basis of the first code and the second code.

DETAILED DESCRIPTION OF THE INVENTION

[Configuration of a Measurement Apparatus 1]

Figure 1:
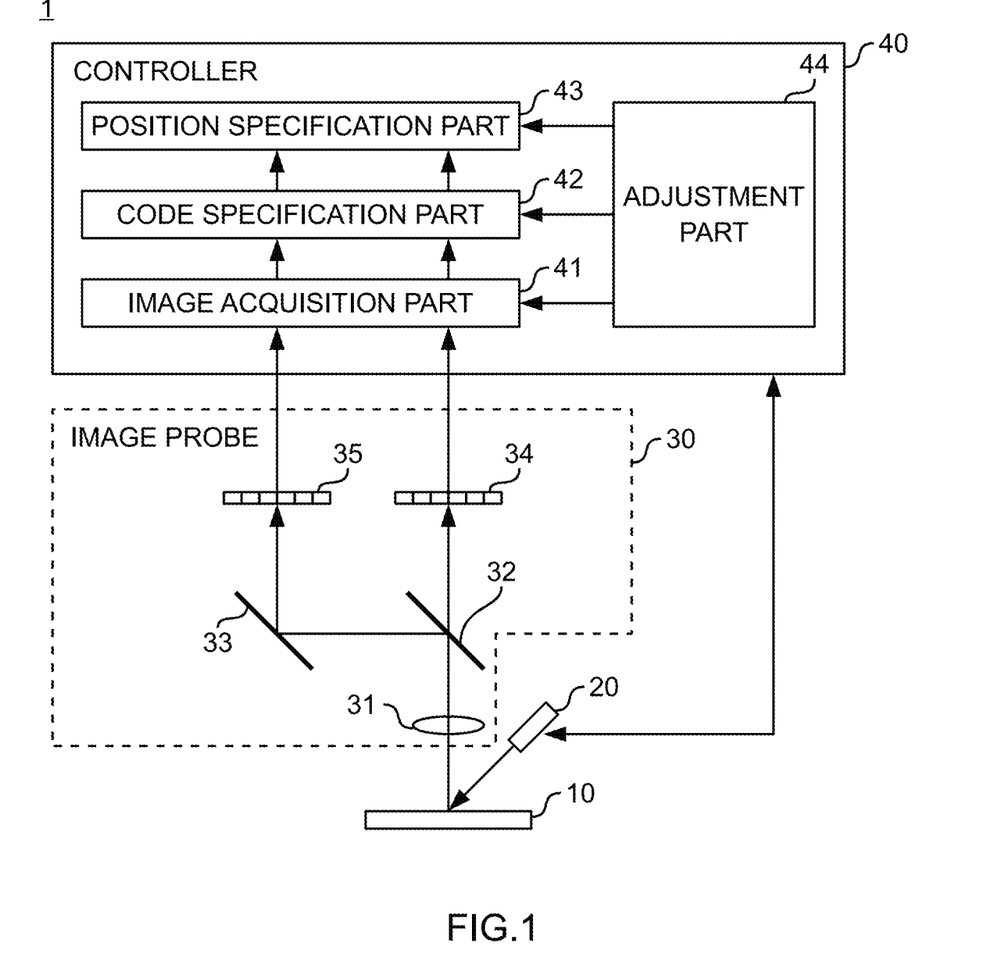
FIG. 1 is a diagram showing a configuration of a measurement apparatus.

FIG. 1 is a diagram showing a configuration of a measurement apparatus 1 according to the present exemplary embodiment. The measurement apparatus 1 is, for example, an image measurement machine for detecting an edge of an object to be measured and the like. The measurement apparatus 1 includes a two-dimensional scale 10, a lighting device 20, an image probe 30, and a controller 40. In the present exemplary embodiment, the measurement apparatus 1 functions as a position specifying apparatus that specifies the position of the image probe 30 on the two-dimensional scale 10.

Figure 2:
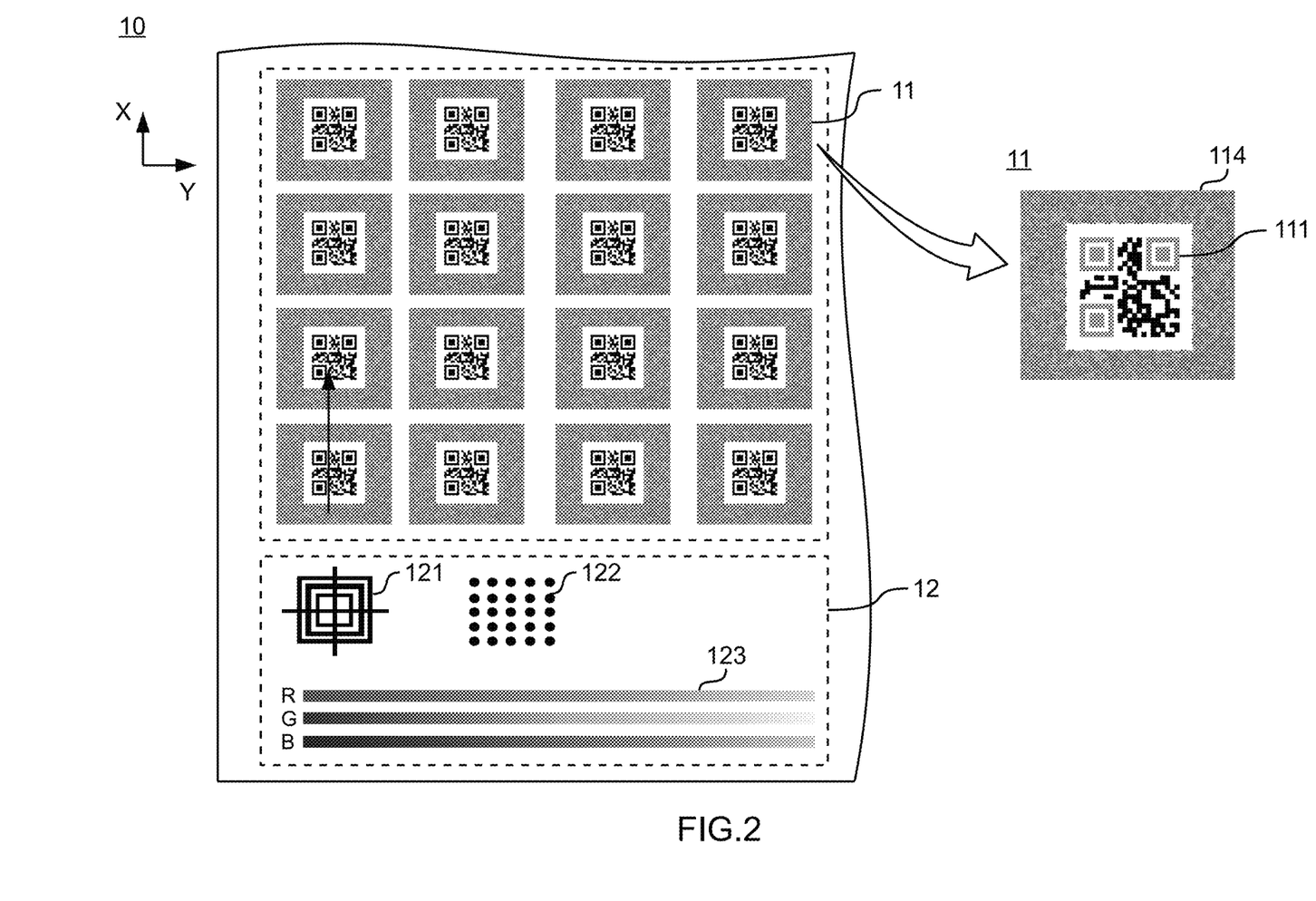
FIG. 2 is a diagram showing a part of a two-dimensional scale.

A plurality of pattern images for determining the absolute position of the image probe 30 is arranged on the two-dimensional scale 10. FIG. 2 is a diagram showing a part of a two-dimensional scale 10. As shown in FIG. 2, on the two-dimensional scale 10, pattern images 11 including a two-dimensional code 111 and a quasi-random pattern 114 are periodically arranged in the X and Y directions. Further, a calibration image 12 for performing various adjustments is arranged on the two-dimensional scale 10.

The two-dimensional code 111 includes position information indicating the position of the two-dimensional code 111 on the two-dimensional scale 10. The quasi-random pattern 114 is used to specify how much the two-dimensional code 111 included in a captured image captured by the image probe 30 deviates from a center of a field of view corresponding to the captured image.

The quasi-random pattern 114 has a common pattern in the plurality of pattern images 11.

Figure 3:
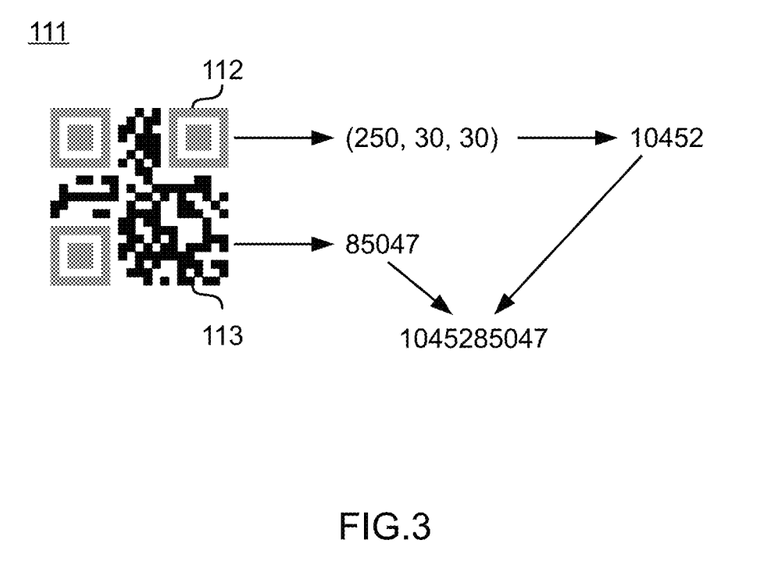
FIG. 3 is a diagram showing details of a two-dimensional code included in a pattern image.

FIG. 3 is a diagram showing details of the two-dimensional code 111 included in the pattern image 11. As shown in FIG. 3, the two-dimensional code 111 is, for example, a QR code (registered trademark). The two-dimensional code 111 has position detection patterns 112 for detecting the position of the two-dimensional code 111 at three corners. Further, the two-dimensional code 111 has a combination pattern 113 of a first pixel value module and a second pixel value module in a portion other than the position detection pattern 112. The module is a minimum unit image constituting a combination pattern. Here, the first pixel value is a pixel value corresponding to white, and the second pixel value is a pixel value corresponding to black. It should be noted that, in the present exemplary embodiment, the two-dimensional code 111 is described as a QR code, but it is not so limited. For example, a micro QR code may be used as the two-dimensional code 111.

The position detection pattern 112 has a structure in which a first square having seven modules on each side, a second square, in white, having five modules on each side, and a third square having three modules on each side are superimposed. The color of the first square and the color of the third square are, for example, the same color. The color of the first square and the color of the third square are colors different from white and are colors that can be read by a monochrome sensor 34 and a color sensor 35, which will be described later. The position detection pattern 112 forms a pattern, whose type is different from that of the combination pattern 113, with the color of the first square and the color of the third square. It should be noted that the color of the first square and the color of the third square are the same, but it is not so limited and the colors of the first square and the third square may be different colors.

In the present exemplary embodiment, the two-dimensional code 111 includes a first code and a second code. The first code is a code specified by the combination pattern 113. The second code is a code specified by a pattern whose type is different from the combination pattern 113, and the second code is formed by the color of the first square and the color of the third square. The second code is information indicating the approximate position of the two-dimensional code 111 on the two-dimensional scale 10, and the first code is information indicating the detailed position of the two-dimensional code 111 at the approximate position.

In the example shown in FIG. 3, the colors of the first square and the third square of the position detection pattern 112 are 250, 30, and 30 in RGB value. Further, the value of the second code is 10452. Furthermore, the value of the first code is 85047. It is assumed that the position information indicating the position of the two-dimensional code 111 is associated with, for example, a concatenated code obtained by concatenating the first code and the second code.

Figure 4:
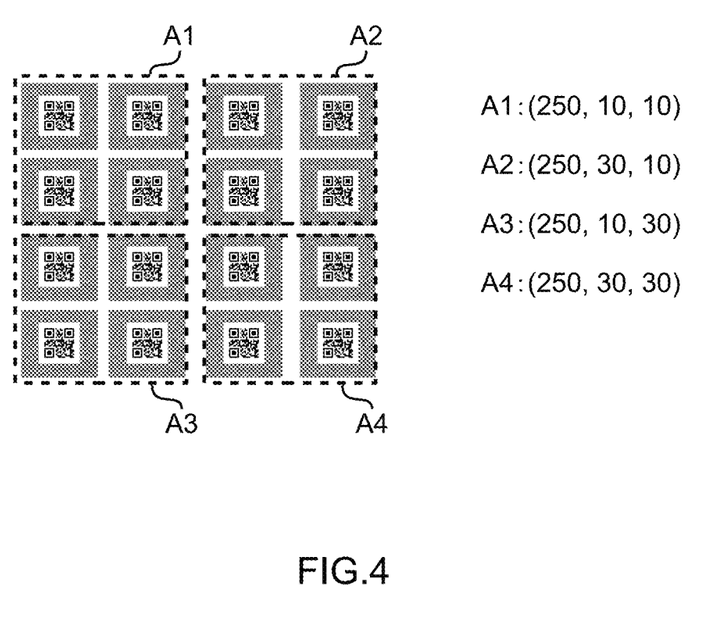
FIG. 4 is an example of a color of a position detection pattern of the two-dimensional code.

FIG. 4 shows an example of the color of the position detection pattern 112 of the two-dimensional code 111. In the example shown in FIG. 4, areas A1 to A4 corresponding to four of the two-dimensional codes 111 are provided. The same approximate position is assigned to the four two-dimensional codes 111 included in one area, and the colors of the position detection patterns 112 of these two-dimensional codes 111 are the same. For example, the color of each of the position detection patterns 112 of the four two-dimensional codes 111 included in the area A1 is 250, 10, and 10 in the RGB value.

The lighting device 20 is, for example, stroboscopic lighting or LED lighting. The lighting device 20 is connected to the controller 40, and irradiates the two-dimensional scale 10 with light according to the control of the controller 40. The image probe 30 includes an optical lens 31, a half mirror 32, a mirror 33, the monochrome sensor 34, and the color sensor 35. The optical lens 31 collects the light, which is radiated by the lighting device 20 and reflected by the two-dimensional scale 10, and causes this light to be incident to the half mirror 32. The half mirror 32 separates the light collected by the optical lens 31 into light incident to the monochrome sensor 34 and light incident to the color sensor 35. The mirror 33 reflects the light separated by the half mirror 32 and makes it incident to the color sensor 35.

The monochrome sensor 34 is a monochrome camera including a plurality of light receiving elements. The monochrome sensor 34 changes the brightness of the light reflected by the two-dimensional scale 10 into an electric signal. As a result, the monochrome sensor 34 generates a first captured image by capturing at least a part of the area of the two-dimensional scale 10. The monochrome sensor 34 outputs the generated first captured image to the controller 40.

The color sensor 35 is, for example, a color camera having light receiving elements corresponding to each of the three primary colors of red, green, and blue. The color sensor 35 generates a second captured image by capturing the same area as the area of the two-dimensional scale 10 captured by the monochrome sensor 34. The color sensor 35 outputs the generated second captured image to the controller 40. It should be noted that the color sensor 35 is not limited to a color camera, and may be another apparatus as long as it can specify the color of the position detection pattern 112 of a two-dimensional code.

Here, the monochrome sensor 34 and the color sensor 35 generate a captured image including the entire two-dimension code 111 and at least a portion of the quasi-random pattern 114 corresponding to one pattern image 11 among the plurality of pattern images 11 including the two-dimensional code 111 and the quasi-random pattern 114 arranged on the two-dimensional scale 10. For example, the monochrome sensor 34 and the color sensor 35 generate the captured image of the smallest size among the captured images always including one or more two-dimensional codes 111. In this way, the number of pixels included in the captured image can be set to the necessary minimum number, and so it is possible to shorten i) the length of time required for the monochrome sensor 34 and the color sensor 35 to capture the pattern image 11 and ii) the length of time required for the controller 40 to read the pattern image 11 from the captured image. In addition, the monochrome sensor 34 and the color sensor 35 may generate a captured image including only one pattern image 11 by using some of the light receiving elements.

[Configuration of the Controller 40]

The controller 40 controls the lighting device 20 and the image probe 30 to specify the position, on the two-dimensional scale 10, of the two-dimensional code 111 included in the captured image captured by the image probe 30. As shown in FIG. 1, the controller 40 includes an image acquisition part 41, a code specification part 42, a position specification part 43, and an adjustment part 44.

The image acquisition part 41 acquires a captured image obtained by imaging a partial area on the two-dimensional scale 10 on which a plurality of two-dimensional codes 111 are arranged. Specifically, the image acquisition part 41 transmits a trigger signal for starting the radiation of light to the lighting device 20 to cause the lighting device 20 to radiate light, and transmits the trigger signal for starting the imaging to the monochrome sensor 34 and the color sensor 35 to cause them to image a partial area on the two-dimensional scale 10. The image acquisition part 41 acquires the first captured image, generated by the monochrome sensor 34, including the two-dimensional code 111 and the second captured image, generated by the color sensor 35, including the two-dimensional code 111. The image acquisition part 41 executes the acquisition of the first captured image and the acquisition of the second captured image in parallel.

Figure 5:
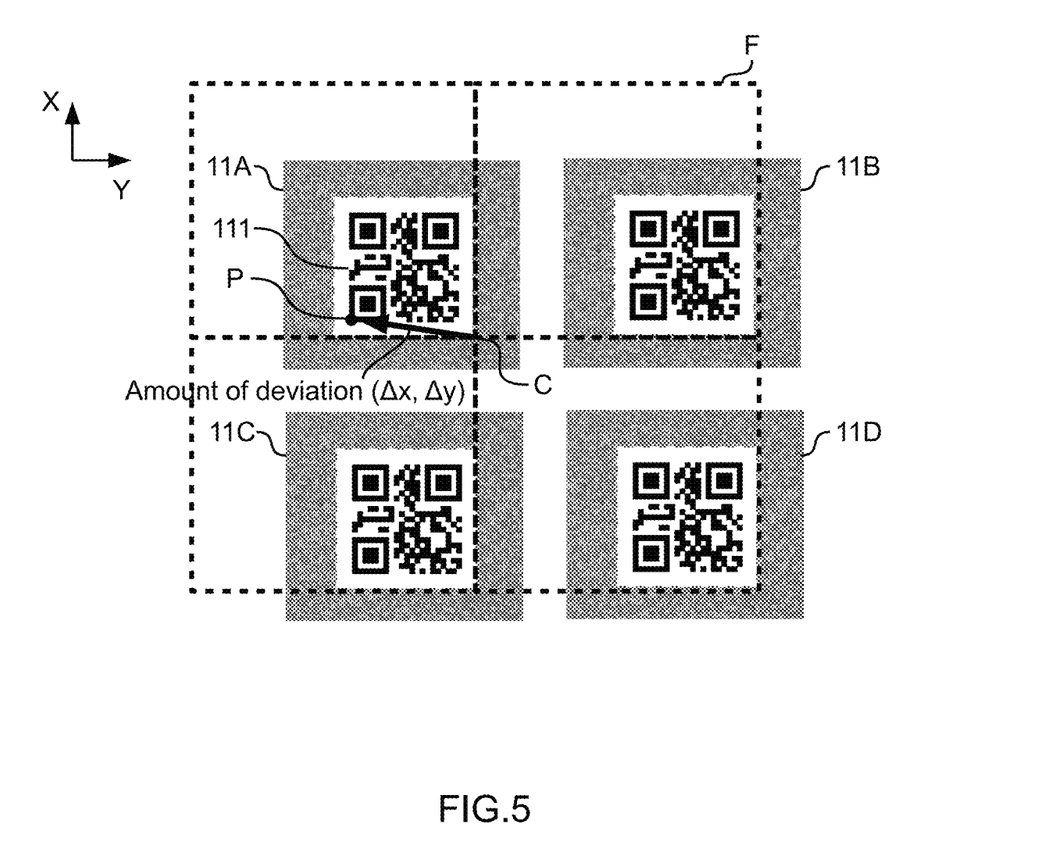
FIG. 5 is a diagram showing an example of a first captured image.

The code specification part 42 specifies the first code and the second code corresponding to the two-dimensional code 111 included in the first captured image and the second captured image on the basis of the first captured image and the second captured image acquired by the image acquisition part 41. Specifically, the code specification part 42 performs an image analysis of the first captured image, and specifies the position detection pattern 112 of the two-dimensional code 111 that is the closest to the center of the field of view corresponding to the first captured image. As a result, the code specification part 42 specifies one two-dimensional code 111 among the one or more two-dimensional codes 111 included in the first captured image. FIG. 5 is a diagram showing an example of the first captured image. In the example shown in FIG. 5, the field of view F is defined as the field of view corresponding to the first captured image. In FIG. 5, the pattern images 11A to 11D are shown, and the pattern image 11A is the pattern image 11 that is the closest to the center C of the field of view F. Therefore, the code specification part 42 specifies the two-dimensional code 111 corresponding to the pattern image 11A. The code specification part 42 extracts the first code included in the two-dimensional code 111 on the basis of the combination pattern 113 of the two-dimensional code 111 included in the first captured image.

Further, when the code specification part 42 specifies the position detection pattern 112 in the first captured image, the code specification part 42 specifies the position detection pattern 112 included in the second captured image by referencing the second captured image. Then, the code specification part 42 specifies an RGB value as the color of the position detection pattern 112. For example, the controller 40 is provided with a storage part (not shown in figures) that stores the RGB value and the second code in association with each other, and the code specification part 42 extracts the second code corresponding to the specified color by specifying the second code associated with the specified RGB value.

Here, the code specification part 42 executes the specification of the first code and the specification of the second code in parallel. In this manner, the measurement apparatus 1 can shorten the time required for specifying the first code and the second code. Further, the code specification part 42 may specify the second code on the basis of the color of at least a part of the position detection pattern 112. In this way, because the measurement apparatus 1 needs to specify only a part of the color of the position detection pattern 112, it is possible to shorten the time required for specifying the color.

It should be noted that, in the present exemplary embodiment, the code specification part 42 specifies the color of the two-dimensional code 111 by specifying the color of the position detection pattern 112, but it is not so limited. The code specification part 42 may specify the color of the two-dimensional code 111 by specifying the color of the other portion of the two-dimensional code 111. For example, the color of the second pixel value of the combination pattern 113 may be set to a color different from black and white, and the code specification part 42 may specify the color of the second pixel value on the basis of the color of the combination pattern 113.

The position specification part 43 specifies the position of the image probe 30 on the two-dimensional scale 10. First, on the basis of the first code and the second code specified by the code specification part 42, the position specification part 43 specifies the position information on the two-dimensional scale 10 of the two-dimensional code 111 including the first code and the second code. For example, the storage part provided in the controller 40 stores i) a concatenated code obtained by concatenating the first code and the second code, and ii) position information on the two-dimensional scale 10 of the two-dimensional code 111 in association with each other, and the position specification part 43 specifies the position information associated with the concatenated code of the first code and the second code specified by the code specification part 42. Here, in the example shown in FIG. 5, the position indicated by the position information of the two-dimensional code 111 is coordinate information on the two-dimensional scale 10 of the position P, which corresponds to one corner of the two-dimensional code 111 corresponding to the pattern image 11A.

Further, the position specification part 43 performs an image correlation analysis process for analyzing the image correlation between the quasi-random pattern 114 included in the first captured image and the template image, and specifies the relative position indicating how much the quasi-random pattern 114 deviates from the center of the first captured image. For example, the template image is an image in which the quasi-random pattern 114 is arranged at the center of the field of view corresponding to the first captured image. The position specification part 43 specifies the relative position by specifying an amount of deviation ($\Delta x$, $\Delta y$), from the center of the field of view, of the quasi-random pattern 114 corresponding to the pattern image 11 that is the closest to the center of the field of view corresponding to the first captured image on the basis of the template image and the first captured image.

The position specification part 43 specifies the center of the field of view of the first captured image, that is, the position of the image probe 30 on the two-dimensional scale 10, on the basis of the specified position information and the specified relative position. In the example shown in FIG. 5, the position specification part 43 specifies the coordinate information corresponding to the center position C of the field of view F on the basis of i) the coordinate information of the position P that corresponds to one corner of the two-dimensional code 111 corresponding to the pattern image 11A and ii) an amount of deviation ($\Delta x$, $\Delta y$) indicating the relative position.

Further, the position specification part 43 may measure the rotation amount between the two-dimensional scale 10 and the image probe 30 around the Z-axis (the axis perpendicular to the two-dimensional scale 10), on the basis of the positions of the plurality of the position detection patterns 112 specified from the first captured image.

The adjustment part 44 performs various adjustments related to processing of the captured image on the basis of the calibration image 12. As shown in FIG. 2, the calibration image 12 includes a dimension adjustment pattern 121, a distortion aberration correction pattern 122, and a color adjustment pattern 123. The dimension adjustment pattern 121 is a pattern for the controller 40 to adjust the dimensions of the captured image in the X and Y directions. The distortion aberration correction pattern 122 is a pattern for correcting distortion aberration, and is a pattern such as a circle or a cross. The color adjustment pattern 123 is a pattern for adjusting the color specified by the code specification part 42.

For example, the adjustment part 44 may acquire a captured image by periodically causing the image probe 30 to capture the dimension adjustment pattern 121, and may adjust the dimensions of the captured image on the basis of the dimension adjustment pattern 121 included in the captured image. Further, when the position specification part 43 performs the image correlation analysis processing using the quasi-random pattern 114 and the template image, the adjustment part 44 may perform distortion aberration correction on the quasi-random pattern 114 and the template image on the basis of the distortion aberration correction pattern 122.

Furthermore, the image acquisition part 41 may generate and acquire the image for adjustment by causing the image probe 30 to periodically image the color adjustment pattern 123. Then, the adjustment part 44 may adjust the color specified by the code specification part 42 and may adjust the amount of light of the lighting device 20 for lighting the two-dimensional scale 10 on the basis of the color of the color adjustment pattern 123 included in the image for adjustment. In this manner, the measurement apparatus 1 can reduce the error in specifying a color.

[Flow of Processing Related to Specifying a Position of the Image Probe 30]

Figure 6:
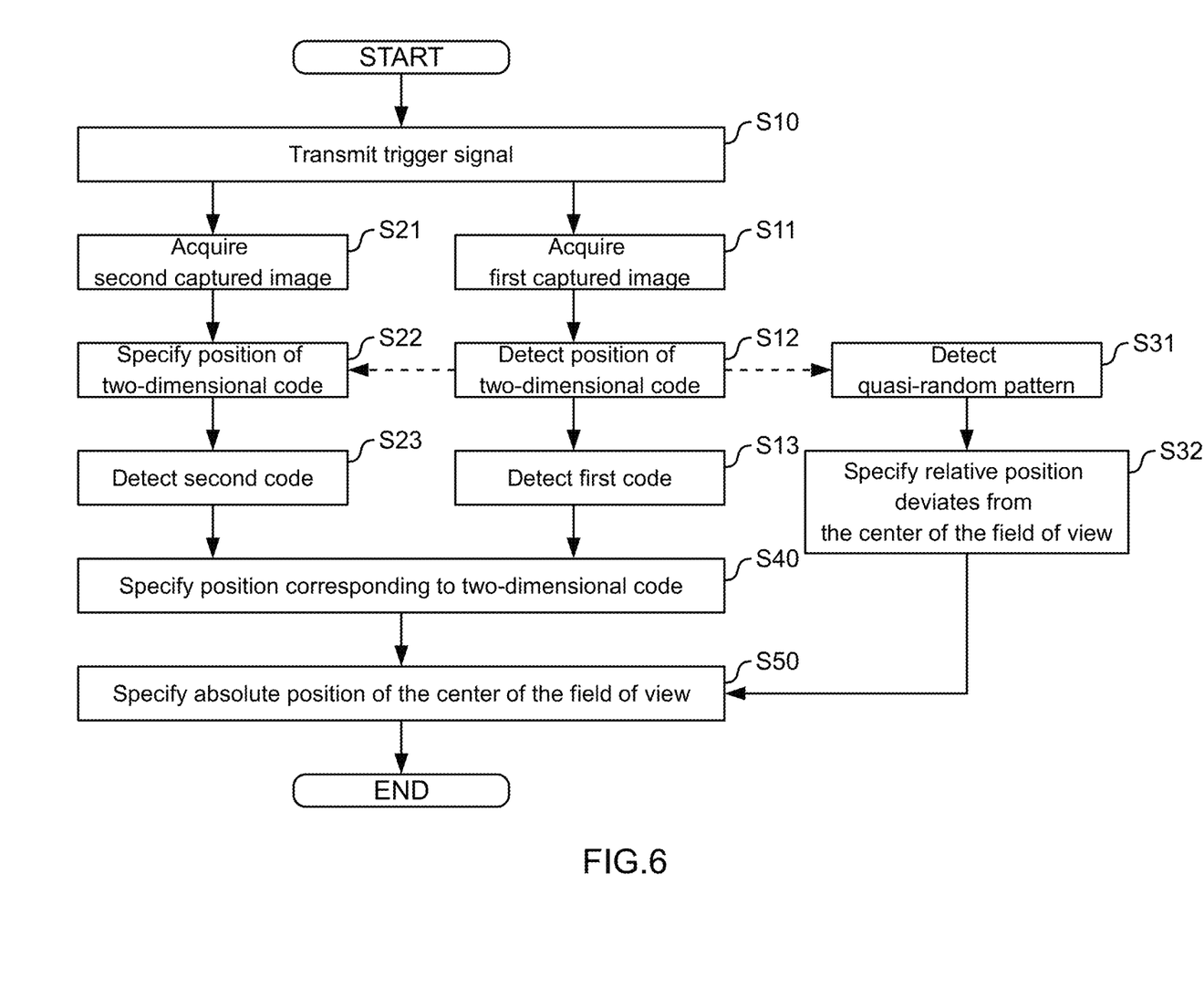
FIG. 6 is a flowchart showing a flow of a process relating to specifying a position of an image probe.

Next, a flow of processing related to specifying a position of the image probe 30 will be described. FIG. 6 is a flowchart showing the flow of processing related to specifying a position of the image probe 30 in the measurement apparatus 1.

First, the image acquisition part 41 transmits a trigger signal to the lighting device 20 and the monochrome sensor 34 and the color sensor 35 of the image probe 30 to image the pattern image 11 on the two-dimensional scale 10 (S10). The image acquisition part 41 acquires a first captured image captured by the monochrome sensor 34 (S11), and acquires a second captured image captured by the color sensor 35 (S21).

When the image acquisition part 41 acquires the first captured image, the code specification part 42 specifies the position of the two-dimensional code 111 in the first captured image (S12) by analyzing the first captured image and by specifying the position detection pattern 112 of the two dimensional code 111. Then, the code specification part 42 specifies the first code from the two-dimensional code 111 included in the first captured image (S13).

When the position of the two-dimensional code 111 is specified in S12, the code specification part 42 specifies, on the basis of the position, the position of the two-dimensional code included in the second captured image (S22). Then, the code specification part 42 specifies the color of the position detection pattern 112 of the two-dimensional code 111 included in the second captured image, and specifies the second code on the basis of the color (S23).

Further, when the position of the two-dimensional code 11 is specified in S12, the code specification part 42 specifies the quasi-random pattern 114 from the first captured image (S31). The position specification part 43 analyzes the image correlation between the specified quasi-random pattern 114 and the template image, and specifies the relative position indicating how much the quasi-random pattern 114 deviates from the center of the field of view of the first captured image (S32).

Here, the image acquisition part 41, the code specification part 42, and the position specification part 43 execute the processing of S11 to S13, the processing of S21 to S23, and the processing of S31 to S32 in parallel. In this manner, the measurement apparatus 1 can shorten the time to specify the position.

When the position specification part 43 specifies the first code in S13 and also specifies the second code in S23, the position specification part 43 specifies the position information associated with the concatenated code of the first code and the second code. As a result, the position specification part 43 specifies the position corresponding to the two-dimensional code 111 (S40).

When the position specification part 43 specifies the position corresponding to the two-dimensional code 111 in S40 and specifies the relative position in S32, the position specification part 43 specifies the absolute position of the center of the field of view in the first captured image on the basis of a position corresponding to the two-dimensional code 111 and the relative position (S50). Because the position of the center of the field of view corresponds to the position of the image probe 30, the measurement apparatus 1 can specify the position of the image probe 30.

[Effect of the Present Exemplary Embodiment]

As described above, the measurement apparatus 1 according to the present exemplary embodiment acquires a captured image obtained by imaging a partial area of the two-dimensional scale 10 on which a plurality of two-dimensional codes 111 having a first code, which is specified by the combination pattern 113 of the first pixel value image and the second pixel value image, and a second code, which is specified by a pattern of a type different from the combination pattern 113, are arranged. The measurement apparatus 1 specifies the first code and the second code corresponding to the two-dimensional code 111 included in the captured image. The measurement apparatus 1 specifies position information on the two-dimensional scale 10 of the two-dimensional code 111 including the first code and the second code on the basis of the specified first code and the specified second code.

In this manner, because the second code as partial information of the position information of the two-dimensional scale 10 can be included in the two-dimensional code 111 as a different type of pattern, it is possible to reduce the size of the two-dimensional code 111 on the two-dimensional scale 10 by reducing the size of the combination pattern 113. Therefore, the number of light receiving elements in the image probe 30 required for reading the two-dimensional code 111 can be reduced, and the reading time of the two-dimensional code 111 on the two-dimensional scale 10 can be shortened.

The present invention is explained with the exemplary embodiments of the present invention but the technical scope of the present invention is not limited to the scope described in the above embodiment. It is apparent for those skilled in the art that it is possible to make various changes and modifications to the embodiment. It is apparent from the description of the scope of the claims that the forms added with such changes and modifications are included in the technical scope of the present invention.

What is claimed is:

1. A position specifying apparatus for specifying a position of a two-dimensional code on a two-dimensional scale on which a plurality of two-dimensional codes are arranged, comprising:

an image acquisition part that acquires a captured image obtained by imaging a partial area on the two-dimensional scale having a color code which shows an approximate position, which is specified by color, of the two-dimensional code on the two-dimensional scale and a pattern code which shows a detailed position, which is specified by a pattern with combination of an image with a first pixel value and an image with a second pixel value, of the two-dimensional code in the approximate position;

a code specification part that specifies the color code and the pattern code corresponding to the two-dimensional code included in the captured image; and a position specification part that specifies position information, on the two-dimensional scale, of the two-dimensional code including the color code and the pattern code on the basis of the color code and the pattern code which are specified by the code specification part, wherein the image acquisition part acquires a monochrome captured image generated by a monochrome sensor scanning the two-dimensional code on the two-dimensional scale and acquires a color captured image generated by a color sensor scanning the two-dimensional code on the two-dimensional scale in parallel, and the code specification part specifies the pattern code based on the monochrome captured image and specifies the color code based on the color captured image in parallel.

2. The position specifying apparatus according to claim 1, wherein the position specification part specifies the position information on the two-dimensional scale corresponding to the two-dimensional code including the pattern code and the color code on the basis of the detailed position indicated by the pattern code and the approximate position indicated by the color code.

3. The position specifying apparatus according to claim 2, wherein the position specification part analyzes image correlation between a quasi-random pattern included in the monochrome captured image and a template image in which a quasi-random pattern is arranged at a center of a field of view corresponding to the monochrome captured image to specify a relative position information indicating how much the quasi-random pattern deviates from a center of a field of view of the monochrome captured image, and the code specification part specifies the pattern code based on the monochrome captured image, specifies the color code based on the color captured image, and specifies the relative position information in parallel.

4. The position specifying apparatus according to claim 1, wherein a pattern image for a color adjustment is arranged on the two-dimensional scale, and the image acquisition part acquires an image for the adjustment obtained by imaging the pattern image, the position specifying apparatus further comprising:

an adjustment part that adjusts a color specified by the code specification part on the basis of a color of a pattern image included in the image for adjustment.

5. The position specifying apparatus according to claim 1, wherein the position specification part analyzes image correlation between a quasi-random pattern included in the monochrome captured image and a template image in which a quasi-random pattern is arranged at a center of a field of view corresponding to the monochrome captured image to specify a relative position information indicating how much the quasi-random pattern deviates from a center of a field of view of the monochrome captured image, and the code specification part specifies the pattern code based on the monochrome captured image, specifies the color code based on the color captured image, and specifies the relative position information in parallel.

6. A position specification method for specifying a position of a two-dimensional code on a two-dimensional scale on which a plurality of two-dimensional codes are arranged, comprising the steps of:

imaging, by an image probe, a partial area on the two-dimensional scale having a color code which shows an approximate position, which is specified by color, of the two-dimensional code on the two-dimensional scale and a pattern code which shows a detailed position, which is specified by a pattern with combination of an image with a first pixel value and an image with a second pixel value, of the two-dimensional code in the approximate position;

acquiring, by a position specifying apparatus, a captured image obtained by capturing by the image probe;

specifying, by a position specifying apparatus, the color code and the pattern code corresponding to the two-dimensional code included in the captured image; and specifying, by a position specification apparatus, position information on the two-dimensional scale of the two-dimensional code including the color code and the pattern code on the basis of the color code and the pattern code which are specified in the code specification step, wherein the image acquisition step acquires, by the position specifying apparatus, a monochrome captured image generated by a monochrome sensor scanning the two-dimensional code on the two-dimensional scale and acquires a color captured image generated by a color sensor scanning the two-dimensional code on the two-dimensional scale in parallel, and the code specification step specifies, by the position specifying apparatus, the pattern code based on the monochrome captured image and specifies the color code based on the color captured image in parallel.

7. The position specification method according to claim 6, wherein the position specification step specifies, by the position specifying apparatus, the position information on the two-dimensional scale corresponding to the two-dimensional code including the pattern code and the color code on the basis of the detailed position indicated by the pattern code and the approximate position indicated by the color code.

8. The position specification method according to claim 7, wherein the position specification step analyzes image correlation between a quasi-random pattern included in the monochrome captured image and a template image in which a quasi-random pattern is arranged at a center of a field of view corresponding to the monochrome captured image to specify a relative position information indicating how much the quasi-random pattern deviates from a center of a field of view of the monochrome captured image, and the code specification step specifies the pattern code based on the monochrome captured image, specifies the color code based on the color captured image, and specifies the relative position information in parallel.

9. The position specification method according to claim 6, wherein a pattern image for color adjustment is arranged on the two-dimensional scale, and the image acquisition step acquires, by the position specifying apparatus, an image for adjustment obtained by imaging the pattern image, the position specification method further comprising the step of:

adjusting, by the position specifying apparatus, a color specified by the code specification step on the basis of a color of a pattern image included in the image for adjustment.

10. The position specification method according to claim 6, wherein the position specification step analyzes image correlation between a quasi-random pattern included in the monochrome captured image and a template image in which a quasi-random pattern is arranged at a center of a field of view corresponding to the monochrome captured image to specify a relative position information indicating how much the quasi-random pattern deviates from a center of a field of view of the monochrome captured image, and the code specification step specifies the pattern code based on the monochrome captured image, specifies the color code based on the color captured image, and specifies the relative position information in parallel.

* * * * *